Patented Apr. 22, 1947

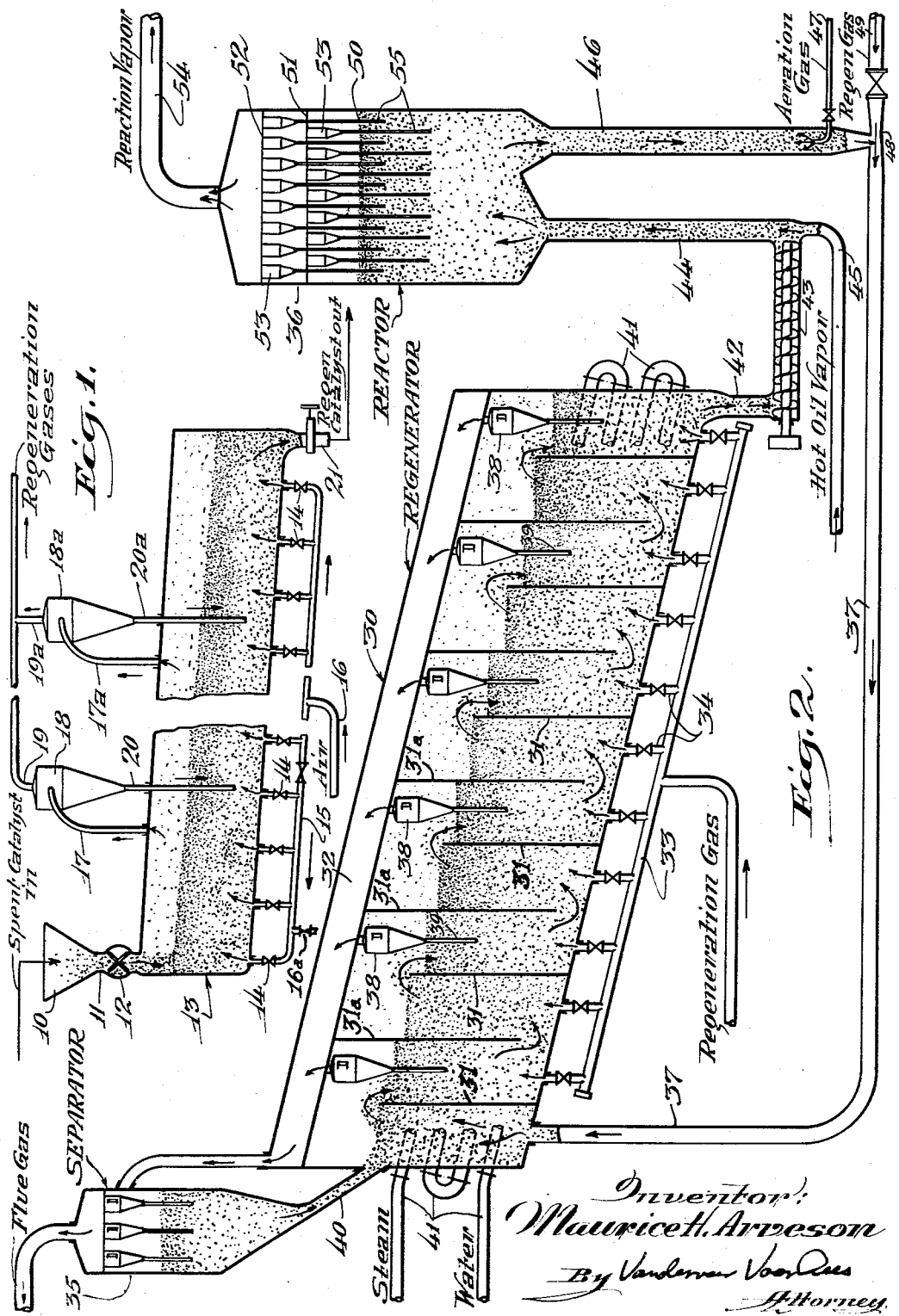

2,419,245

UNITED STATES PATENT OFFICE 2,419,245

REGENERATING CARBON CONTAMINATED CATALYSTS

Maurice H. Arveson, Flossmoor, Ill., assignor to Standard Oil Company, Chicago, Ill., a corporation of Indiana Application August 25, 1941, Serial No. 408,174

4 Claims. (Cl. 252—242)

This invention relates to the conversion of hydrocarbons at high temperatures in the presence of solid, heterogeneous catalysts, generally suspended in the hydrocarbon vapors. It applies especially to the conversion of heavy hydrocarbon oils into lighter products, principally gasoline of high knock rating, by the action of catalysts where the catalyst becomes temporarily deactivated by a deposit of carbonaceous material, thus requiring frequent regeneration. More particularly, the invention relates to a method and apparatus for regenerating the catalyst in such a hydrocarbon conversion process. According to the present invention, the carbonaceous matter is removed from the catalyst by combustion with an oxygen-containing gas applied under specially controlled conditions.

One of the objects of this invention is to control the conditions of regeneration of suspended catalysts more closely than has been done heretofore. Another object of the invention, in some of its forms, is to recover the heat of combustion of the carbonaceous matter deposited on the catalyst. Still another object of the invention is to obtain substantially complete removal of carbon from spent catalyst while maintaining the regeneration temperature within a desired range where the activity of the catalyst will not be permanently impaired. Other objects of the invention will be apparent from the following description.

The invention is illustrated by drawings in which

Figure 1 is a diagrammatic elevation in long section of one modification of the regenerator wherein the catalyst flows thru a long, substantially unobstructed path in which it is subjected to the oxidizing action of regeneration gases. The chamber may be horizontal or slightly inclined.

Figure 2 is another modification of the regenerator connected to a reactor. The regenerator is shown with vertical baffles which assist in regulating the flow of the catalyst as hereinafter described. It will generally be inclined more than the form shown in Figure 1 to overcome resistance of the baffles.

Referring to Figure 1, catalyst in the form of fine granules or powder is introduced into feed hopper 10 and passes by line 11 and feeder valve 12 into the end of the regenerator 13. The shell of regenerator 13 is preferably a long cylindrical drum placed horizontally or very slightly inclined as shown to facilitate the flow of catalyst therethru.

The catalyst is supplied preferably as a "dense" phase but not compacted. The catalyst density may be in the range of about 10 to 25 pounds per cubic foot. In this form it is a free flowing fluid and will seek a level in the regenerator. If the powdered catalyst in this dense phase condition is subjected to agitation with a large amount of gas, it passes thru a disperse phase, whereas if the dense phase catalyst is allowed to stand for a long period without agitation, gas separates from it and passes into the compacted state and then will not flow. In my regeneration process, I seek to maintain the catalyst in dense phase and in a free flowing condition.

As the catalyst flows from the inlet end of regenerator 13 to the opposite end, it is maintained in active motion by jets of regenerator gas which are introduced at the bottom thru ports 14 supplied by header 15 connected with a source of regeneration gas by line 16. For this purpose air may be employed, diluted, if desired, with inert gas such as flue gas or spent regeneration gas discharged from the regenerator 13 as presently described.

As the regeneration gas containing oxygen flows thru the catalyst, it effects oxidation of the carbonaceous material contained thereon. It is important to control the rate of oxidation, for example, by the amount of regeneration gas introduced at any one point in the regenerator, or by the oxygen concentration of the regeneration gas which may very conveniently be from 5 to 21% or even as low as 2%. It is preferable to employ air and control the amount. In this manner the temperature is kept below the deterioration temperature of the catalyst which is usually around 1200 to 1600° F. depending on the catalyst used. Catalysts of the active silica-alumina type may be subjected to temperatures of the order of 1400° F. whereas catalysts of the magnesia-active silica type are more sensitive to temperature and should be kept at below 1200° F. during regeneration. The composition as well as the amount of regeneration gas may be varied at different points along the catalyst path, and in general I prefer to increase the concentration of oxygen and/or decrease the amount of gas supplied as the catalyst progresses.

As indicated above, it is desirable to maintain a level of dense phase catalyst within the regenerator 13, this level extending from end to end. Above the dense phase level, the regeneration gases containing some dispersed catalyst are conducted away from the regenerator by lines 17 and 17a leading to cyclone separators 18 and 18a from which the gases are vented by lines 19 and 19A and catalyst is returned to the dense phase body within the regenerator by drop legs 20 and 20a. Any desired number of vapor discharge outlets may be employed. At the charge end of the regenerator it is necessary to control the oxygen concentration by the quantity of the gas added quite closely to prevent overheating of the catalyst. At the discharge end of the regenerator, however, more oxygen may be employed to effect complete regeneration. The regenerated catalyst passes out of the regenerator by line 21 which may lead directly to the hydrocarbon reactor as indicated in Figure 2. The amount of carbon removed from the catalyst in the regenerator will ordinarily be about ½ to 2%, based on catalyst, altho smaller or larger amounts may be removed if desired. A large carbon deposit on the catalyst reduces the capacity of the regenerator because of the necessity for maintaining the temperature within the safe regeneration temperature range. Cooling of the regenerator is effected by cooling tubes located in the dense turbulent catalyst phase, but also if desired, by recycling cold regenerated catalyst or by recirculating cooled regeneration gases thru the regenerator with the regeneration gas introduced by line 16.

In order to facilitate maintaining the desired catalyst level and distribution, baffles may be employed within the shell 13. For example, vertical baffles may be placed at intervals to effect a cascade of catalyst. Likewise the catalyst flowing thru the regenerator 13 may be required to take a tortuous path by means of vertical baffle plates placed crosswise, for example, on opposite sides of the regenerator 13 and staggered to increase the effective length of the passage thru the regenerator.

Referring now to Figure 2, the regenerator 30 is suitably a cylindrical vessel, inclined slightly from the horizontal and divided internally with suitable baffles 31 and 31a shown in cross section in the drawing. A channel 32 formed in the upper part of the regenerator by a longitudinal baffle serves to carry away the spent regeneration gases. A suitable manifold 33 with connections 34 is employed for introducing oxidizing regeneration gases at the bottom of the compartments thru which the catalayst flows. Spent regeneration gases are discharged thru a catalayst separator 35 and the regenerated catalyst is contacted with hydrocarbon oil vapors in reactor 36.

In operation, the spent catalyst enters the regenerator in suspension in gas or air by line 37 entering the base of the first regeneration zone. From this zone the catalyst overflows the baffle 31, then flows downwardly under the next succeeding baffle plate. The flow of the catalyst is aided by gravity with the result that a cascade of catalyst is maintained in the regenerator. From each compartment or pair of compartments the spent regeneration gases escape into duct 32 thru dust separators 38 which remove most of the fine catalayst which is carried out by the spent regeneration gases. The catalyst separated in this way flows thru catalyst legs 39 leading to points below the surface of the catalyst in the lower part of each compartment. The catalyst which is carried away from duct 32 is further recovered in separator 35 and is conducted by line 40 back to the catalyst stream flowing thru the regenerator. By reintroducing the catalyst thus recovered into the initial stages of the regenerator, it assists in cooling the catalyst undergoing regeneration therein. If desired, recovered catalyst from separator 35 may be introduced at a later stage of the regenerator in a similar manner.

In order to assist in removing the heat of regeneration and maintaining temperature control, I employ cooling tubes in the regenerator 30. These tubes are indicated diagrammatically by dotted lines and return bends 41. The cooling fluid may be steam or water under high pressure, a water spray or mist, molten salts, oil streams, e. g., diphenyl, etc. It is not necessary to prevent leakage of gas thru the baffle plates 31 and 31a where these are pierced by the tubes inasmuch as pressure differentials are low, generally of the order of a fraction of a pound per square inch and the tendency for leakage is correspondingly low. A small amount of leakage, either of catalyst or gas, has no harmful effect.

The amount of air introduced into the successive regeneration compartments by connections 34 is regulated in a manner to maintain the desired temperature in the various sections of the regenerator and it is desirable to distribute thermocouples thruout the regenerator in order to determine the temperature and avoid excessive temperature rise at any point. Where the temperature becomes too high the air supply may be reduced or the oxygen concentration in the air supplied to any particular section of the regenerator may be diminished by any suitable means, for example, by injecting an air-flue gas mixture at 16a.

From the lower end of the regenerator the catalyst flows by suitable standpipe or connection 42 thru meter or feeder 43 into column 44 leading to reactor 36. Instead of automatic feeder 43, any suitable feeding device, for example, a slide valve, may be employed for regulating the rate of introduction of the regenerated catalyst into the reactor. Thus, I may use an eductor thru which is passed a stream of oil vapors leading to the reactor. I may also use an automatic rotary valve for this purpose.

To the base of column 44 there is supplied by line 45 a stream of heated oil vapor to be converted and the catalyst is suspended in the oil vapor and carried upward thru column 44 into reactor 36 where it forms a dense phase in a lower section of the reactor. As the reaction proceeds and the catalyst becomes deactivated, the catalyst is withdrawn continuously thru column 46 leading back to the regenerator. Aeration gas, such as steam, introduced into the base of column 46 by line 47 serves to strip hydrocarbons from the catalyst and to maintain the catalyst in freeflowing condition therein. The spent or partially spent catalyst flows into an eductor 48 in the base of 46 where it is dispersed in a high velocity stream of gas, preferably an oxygen-containing gas introduced by line 49 and the resulting dispersion is carried to the regenerator thru line 37 previously described.

The catalyst is introduced and withdrawn from reactor 36 at a sufficient rate to maintain a level of dense phase catalyst therein as indicated by the wavy line 50. Cyclone type catalyst separators, preferably of small diameter in the interest of higher efficiency, are disposed in the vapor space in the upper part of reactor 36 above the dense phase catalyst level. In a preferred form of construction the vapor space is divided into sections by diaphragms or plates 51 and 52. The cyclone separators 53 discharge upward thru these diaphragms and the vapors passing the first set of separators on plate 51 are forced to pass in series thru the second set of separators on plate 52 before they gain the exit at outlet 54. Dust legs 55 from the separators 53 extend below the catalyst level in the lower part of the reactor 36 conducting separated catalyst back to the dense phase and preventing its escape from the system.

The catalysts used in my process are generally siliceous type cracking catalysts, for example, active silica in combination with other metal oxides which act as promoters. Silica gel or precipitated silica in combination with alumina or magnesia are suitable catalysts, the latter oxides being present generally in the amount of about 5 to 25%. Acid treated clays, such as bentonite, are also effective catalysts. The catalysts may be in the form of a fine powder or granular material, for example, 10 to 15 mesh. In general, however, the catalyst which I prefer to employ is in the form of a powder finer than this having a particle size corresponding to about 100 to 400 mesh and even finer. I may also use my improved regenerator to restore other solid catalysts which have been contaminated with carbonaceous deposits. Dehydrogenation catalysts containing VI group metal oxides are examples.

In cracking I prefer to employ about ½ to 5 parts of catalyst by weight for each part of oil treated and it is usually desirable to maintain in the reactor sufficient catalyst to provide a catalyst contact as indicated by the rate of about 1 pound of oil per hour per pound of catalyst present in the reactor. However, this contact factor may be greater or less; for example, it may be as low as ½ pound per hour or as high as 10 pounds per hour in some cases.

The temperature of conversion is usually within the range of about 800 to 1050° F. but will vary in different operations with different catalysts and different feed stocks. For example, when employing acid treated bentonite catalyst with a contact factor of 1 and charging midcontinent gas oil, I may employ a temperature of about 925° F. to obtain a conversion of about 30 to 40% of the stock into gasoline. It is preferable to employ low pressures, generally slightly above atmospheric pressure, for example, 5 to 25 pounds per square inch gage and generally not more than 50 to 100 pounds per square inch. When employing pressure, it is desirable to operate the regenerator and reactor at about the same pressure, in order to avoid the difficulties involved in catalyst transfer between zones of widely different pressures.

As indicated hereinabove, in the regeneration of the catalyst, it is important to avoid excessive temperatures resulting from the exothermic regeneration reaction or combustion of carbon on the surface of the catalyst. In general, temperatures of the order of 1000 to 1200° F. are satisfactory for most catalysts. Higher temperatures will result in permanent loss of activity in the case of some catalysts such as the magnesia-silica catalysts, without excessive degeneration altho loss of activity is greater at these temperatures than when the catalyst is regenerated at lower temperatures. Recirculation of cooled gas assists in controlling temperature by increasing the mass of material to be heated and also by reducing the oxygen concentration. However, if additional cooling is required, it is preferred to withdraw catalyst from the generator, pass it thru a cooler and return it with an air stream to the regenerator.

Altho I have described my process of regeneration of powdered catalyst particularly as it is applied to the cracking of heavy hydrocarbon oils, the process is also applicable to other high temperature reactions with powdered, solid, refractory catalysts. For example, processes of catalytic hydrogenation, dehydrogenation, aromatization of napthas, and reforming of napthas in the presence of hydrogen as well as catalytic polymerization and alkylation carried out at elevated temperatures generally within the conversion range, with the aid of suspended powdered catalysts, may also be improved by the application of my regeneration method. My method of regenerating powdered, solid catalysts has the advantage over methods heretofore employed of improving control of the oxidizing conditions and consequently regeneration temperatures prevailing thruout the regenerator. The flow of regeneration gases in my apparatus is across the current of catalyst, thereby providing for independent regulation of the atmosphere within the regenerator at a plurality of points. It is desirable, of course, to have numerous temperature indicating elements distributed thruout the regenerator in order to aid in control of air injection and to avoid excessive heating of the catalyst. Altho the catalyst is in active turbulent motion in the regenerator, the net flow is in one direction which makes possible a progressive regenerating path providing the catalyst path is sufficiently long to prevent complete mixing. It is an important purpose of my invention to provide such an elongated catalyst path, either by the use of an elongated regeneration chamber as shown in Figure 1 or by the use of a baffled chamber as shown in Figure 2.

Altho I have described my invention by means of certain specific embodiments thereof, I intend that it be defined only by the following claims.

I claim:

1. The process of regenerating spent, finely divided, solid conversion catalyst which has become contaminated with carbonaceous matter which comprises introducing said catalyst into the upper end of an elongated regeneration zone inclined from the horizontal, passing said catalyst over and under a succession of substantially vertical baffles within said regeneration zone, maintaining a succession of short vertical columns of aerated dense phase catalyst between said baffles, introducing an oxygen-containing regeneration gas at the bottom of said catalyst columns, thereby effecting aeration and regeneration of said catalyst by combustion of said carbonaceous matter, controlling the admission of oxygen-containing regeneration gas to said catalyst to avoid overheating the catalyst by too rapid regeneration, discharging said regeneration gases from the space above the catalyst in said columns, and withdrawing regenerated catalyst from the lower end of said inclined regeneration zone.

2. The process of regenerating spent, subdivided, solid metal oxide catalyst contaminated with carbonaceous matter which comprises conveying a stream of said catalyst in dense fluid suspension thru a tortuous passage in a horizontally inclined elongated regeneration zone, said catalyst being introduced into the upper end of said zone, causing said catalyst to flow by gravity thru a succession of pools in said tortuous passage and effecting the removal of carbonaceous matter by combustion with oxygen-containing regeneration gas flowing transversely across said catalyst stream, said gas being introduced at the bottom of and withdrawn from the top of said pools, regulating the rate of introduction of regeneration gas to provide turbulence and to maintain said catalyst in dense, free-flowing suspension, maintaining the temperature of the catalyst within the regeneration range by the exothermic heat of oxidation of said carbonaceous matter while avoiding excessive temperatures damaging to said catalyst, and withdrawing regenerated catalyst from the lower end of said inclined elongated regeneration zone.

3. The process of regenerating spent, finely divided solid metal oxide hydrocarbon conversion catalyst which has become contaminated with carbonaceous matter deposited thereon in a hydrocarbon conversion operation, said regeneration process comprising introducing an aerated, dense, fluidized stream of contaminated catalyst into the upper end of an elongated regeneration zone inclined from the horizontal thru which the said catalyst stream flows by gravity, introducing into said stream at a plurality of points in the bottom thereof spaced in the direction of flow, an oxygen-containing regeneration gas, causing said gas to flow upwardly transversely across said catalyst stream from bottom to top thereof, thus effecting regeneration of said catalyst in successive stages, each stage being independently supplied with regeneration gas and independently aerated thereby, controlling the concentration of oxygen in the regeneration gas to provide a higher concentration of oxygen in the gas introduced into the succeeding stages of said regeneration zone than the concentration introduced into the preceding stages of said regeneration zone while maintaining the temperature of said catalyst within the regeneration range by the exothermic heat of oxidation of said carbonaceous deposits, removing spent regeneration gas from the surface of said catalyst stream and withdrawing aerated regenerated catalyst from the lower end of said horizontally inclined regeneration zone.

4. An apparatus for regenerating subdivided solid hydrocarbon conversion catalyst which comprises an elongated, horizontally inclined, substantially cylindrical regeneration chamber, vertically disposed alternately depending and standing baffles within said chamber defining a continuous passage therethrough with successive catalyst pools alternately connected at top and bottom, an inlet for introducing catalyst at the upper end of said regeneration chamber, an outlet for regenerated catalyst at the lower end of said regeneration chamber, means for introducing oxygen-containing regeneration gases at a plurality of points near the bottom of said pools in intimate contact with catalyst flowing therein whereby said catalyst is maintained in free-flowing aerated condition while passing thru said regeneration chamber and an outlet at the top of said regeneration chamber for spent regeneration gases.

MAURICE H. ARVESON.

REFERENCES CITED

The following references are of record in the file of this patent:

UNITED STATES PATENTS

| Number | Name | Date |
|---|---|---|
| 1,984,380 | Odell | Dec. 18, 1934 |
| 2,065,643 | Brandt | Dec. 29, 1936 |
| 2,239,801 | Voorhees | Apr. 29, 1941 |
| 2,245,531 | Payne | June 10, 1941 |
| 2,227,416 | Payne | Dec. 31, 1940 |
| 2,248,196 | Plummer | July 8, 1941 |
| 2,253,486 | Belchetz | Aug. 19, 1941 |
| 2,261,151 | Fast | Nov. 4, 1941 |
| 2,264,438 | Gaylor | Dec 2. 1941 |
| 1,450,677 | Chickering | Apr. 3, 1923 |
| 1,614,220 | Wendel | Jan. 1, 1927 |
| 1,634,480 | Wickenden | July 5, 1927 |
| 1,763,063 | Oberle | June 10, 1930 |
| 1,960,616 | Bartram | May 29, 1934 |
| 2,311,564 | Munday | Feb. 16, 1943 |
| 1,696,658 | Trumble | Dec. 25, 1928 |
| 2,316,664 | Brassert et al. | Apr. 13, 1943 |
| 2,371,619 | Hartley | Mar. 20, 1945 |
| 2,273,076 | Voorhees | Feb. 17, 1942 |
| 2,320,273 | Gohr et al. | May 25, 1943 |
| 2,296,498 | Brassert | Sept. 22, 1942 |
| 2,226,578 | Payne | |

FOREIGN PATENTS

| Number | Country | Date |
|---|---|---|
| 506,544 | German | 1930 |
| 193,071 | British | 1923 |